Patented June 22, 1937

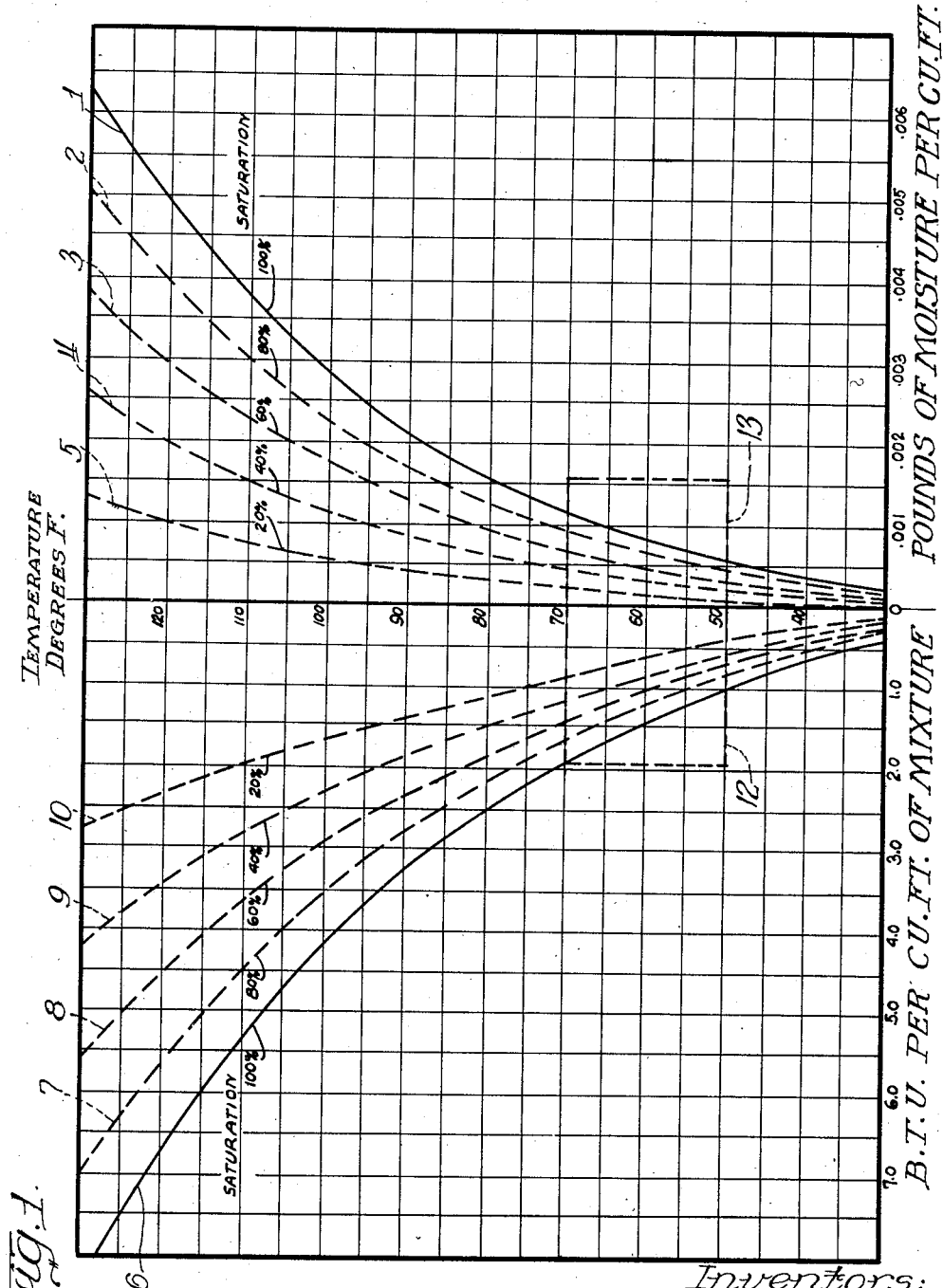

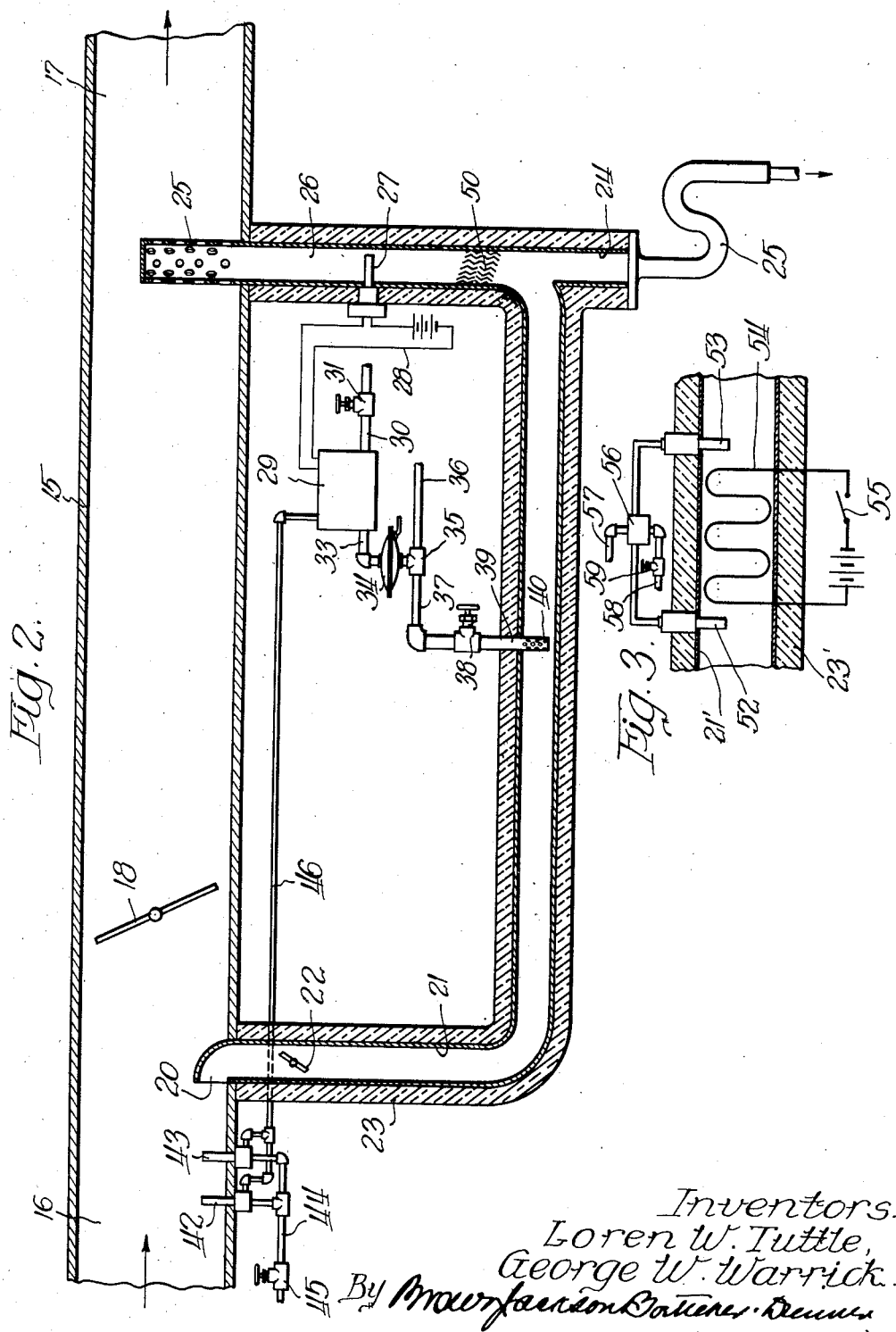

2,084,514

UNITED STATES PATENT OFFICE 2,084,514

HUMIDITY CONTROL SYSTEM

Loren W. Tuttle, Arlington Heights, and George W. Warrick, Harvey, Ill.

Application November 8, 1933, Serial No. 697,224

12 Claims. (Cl. 261—76)

This invention relates to humidity control systems, and more particularly to humidity control systems for gases passing through service conduits and the like, although the principles embodied in the control system are equally applicable to air conditioning systems and other allied gas conditioning systems.

In the preferred embodiment of the invention herein disclosed, we show the application of our humidity control system to a gas service pipe leading from a distribution center to a point of consumption, this pipe being the supply to a series of pipes forming a distribution network. However, we desire it understood that the invention can be applied equally well to an inlet duct for an air conditioning system or the like.

During the past few years, piping of natural gas from its source to various municipal or centrally located distribution centers has become common practice. This gas differs from manufactured or coke gas in that its humidity is relatively low, of the order of 4 or 5%, and this dry gas, when circulated through piping constructed for the conduction of manufactured gas, has a tendency to dry out the packing at the pipe joints, which results in contraction of this packing and consequent leakage of gas. This leakage in many instances becomes large enough to cause an appreciable loss in the volume of gas conducted, as well as increasing, to a large extent, the dangers inherent to the combustibility characteristics of the gas.

Attempts to remedy this situation, so far as we are aware, have been along two general lines. In one type, called the "temperature rise" system, steam is added to the gas in controlled quantities to raise the temperature of the gas a given number of degrees. However, in such a system the steam required to saturate the gas raises its temperature only a small amount, because of the relatively small heat content of the vapor added to the gas to effect saturation.

The other system is commonly called the "wet and dry bulb" system, and is based upon the principle that the amount of depression of a wet bulb thermometer is a function of the amount of saturation of the gas stream contacting therewith. Control equipment is provided to maintain the moisture content of the gas in accordance with a predetermined wet bulb depression, or differential between the dry bulb and wet bulb temperatures. By varying this depression or differential, a wide range of saturation may be obtained.

Both of these systems are objectionable in that the temperature of the dew point varies considerably with a constant depression or differential for different ranges of dry bulb temperature. Also, the maximum depression to which wet and dry bulb instruments will control, in our experience, is only 10 to 14° F. and if the dry bulb temperature is 60° or above, the dew point cannot be lower than 34° F. Such a condition is extremely undesirable, in service distribution of fuel gas, since low ground temperatures may cause condensation and freezing in service pipes.

The primary object of our invention is to provide a humidity control system which will impart to the gas sufficient humidity to overcome losses by leakage and the like, and which will positively maintain a definite, but controllable, dew point in the gas stream. This constant maintenance of an absolute humidity or moisture content of the gas sufficient to prevent leakage and yet of such character as to eliminate dangers of condensation or freezing, is the essence of the present invention.

The operation and effectiveness of our control system resides in the fact that the process of humidification or dehumidification is, in reality, a process of adding heat to the gas in the form of moisture or steam when humidification is desired, or of substracting heat from the gas in the form of moisture condensed therefrom when dehumidification is desired. Heat may be added to the gas stream by first saturating it with injected steam, which heat is equivalent to the weight of steam added times its vapor density, a relatively small quantity under most conditions, and then by injecting further steam which condenses in the gas stream, adding a relatively large quantity of heat since this heat is equivalent to the weight of steam added times its latent heat of vaporization. Since the heat content of the ordinary gas stream is substantially constant, even though relatively large variations in moisture content and temperature may occur, because of the negligible density of vapor and gas, it is apparent that an extremely accurate control of absolute humidity and temperature may be accomplished by governing the amount and quality of the steam injected into the gas stream.

We propose, in the preferred application of our humidity control system, to accomplish control of the humidity of a gas stream by drawing off a definite fraction of the untreated stream, and to treat this fraction in such manner that its readmixture with the main volume of gas will produce the desired conditions of humidity and temperature therein. The control of these conditions can be accomplished either by varying the fraction of gas treated, or by regulating the heat content of the treated fraction by means of a temperature control system which controls the final temperature of the saturated or treated fraction being returned to the main gas stream.

In order to acquaint those skilled in the art with the construction and operation of one preferred form of our invention, we shall now describe the same in detail in connection with the accompanying drawings, in which:

Figure 1 is a graphical illustration of the relative heat changes and moisture content for different humidity conditions in a gas stream at varying temperatures;

Figure 2 is a diagrammatic showing of a humidity control system embodying the principles of our invention; and Figure 3 is an enlarged detailed view of a modified type of control system.

Referring now in detail to the drawings, in Figure 1 we have combined two charts, one showing the heat content for gases at various percentages of saturation for a given range of temperature, while the other shows the absolute moisture content of these gases for the same range of temperature.

Thus, considering the right hand chart, curve 1 represents the variation in absolute moisture content for a gas completely saturated, this gas having, for example, only .00063 pound of moisture per cubic foot at 50° F. while it has .0063 pound of moisture per cubic foot at 130° F., if it remains completely saturated. Thus, ten volumes of the gas at 50° F. have the same moisture content as one volume at 130° F. Applying this teaching to our humidity control system, it will be apparent that by completely saturating a tenth of the total volume of gas at 130° F. the entire volume of gas would be saturated at 50° F. upon admixture. Thus, by controlling the temperature of the saturated fraction, a definite constant dew point can be maintained in the total volume of gas to be humidified. For example, if a 30° F. dew point is desired in the mixture, this can be obtained by maintaining the temperature of the withdrawn tenth of the volume of gas, which is completely saturated, at 96° F. at the point where it re-enters the main gas stream. This is evidenced by curve 1, which shows that at 96° F., a completely saturated gas will have .0026 pound of moisture per cubic foot, while at 30° F., a saturated gas will have .00026 pound of moisture per cubic foot, thus showing that one-tenth of the total gas volume saturated at 96° F. is equivalent in moisture content to the total gas volume saturated at 30° F.

Thus it is possible to obtain any desired dew point in the treated gas by positively controlling the saturation and temperature of the treated fraction in such manner that its admixture with the untreated portion will produce a resultant temperature and saturation such as will be most efficient for the flow of the gas through the service pipes. Curves 2 to 5 show the increase in moisture content for various percentages of saturation upon increases in temperature. It is obvious that the same application of the principles of our invention could be adduced from the teachings of these curves. Also, the ratio of the withdrawn fraction of gas as compared to the total volume can be varied, such ratio thus determining the final temperature at which the treated fraction is returned to the main gas stream in order to produce the desired conditions of humidity in the main stream.

Considering now the left hand portion of the chart, curve 6 represents a 100% saturated gas, and illustrates the increase in heat content during a corresponding increase in temperature. Thus, a given volume of completely saturated gas at 35° F. will have 0.5 B. t. u. per cubic foot, while at 108° F. it will have 5.0 B. t. u. per cubic foot. Again it is evident that one volume of such gas at 108° F. has a heat content equivalent to ten volumes of the gas at 35° F. Curves 7 to 11 illustrate similar conditions for other percentages of saturation of the gas.

If, for the sake of illustration, we assume .001 pound of steam to have a heat content equivalent to 1 B. t. u., and consider the portion indicated by the line 12 as the amount of heat necessary to raise the temperature of a saturated gas from 50° F. to 70° F., we find that 1 B. t. u. must be added. The dotted line 13 indicates the corresponding increase in moisture content during this increase in temperature, approximately .00055 pound of moisture, which must be added to the gas as vapor, which leaves .00045 pound of steam which is condensed and gives up its heat to the gas. Thus by definitely controlling the quantity of steam at a given temperature and pressure which is admitted to the treated portion of the gas, the saturation and final temperature of this portion of gas can be so regulated as to maintain the desired constant dew point in the main gas stream.

Considering now the application of the principles of our invention to a practical embodiment of a humidity control system, in Figure 2 we have disclosed one manner of practicing our invention in connection with the humidification of a gas stream within a service conduit. Ordinarily this system would be installed at a point adjacent to or at the distribution center, so that the gas piped through the service network will be at the proper dew point.

Referring to the drawings, the service pipe is indicated at 15, and is provided with an inlet end 16 through which the untreated gas enters the control system, and an outlet end 17 through which the treated gas passes into the service network.

Disposed in the duct 15 is a damper 18, of any suitable design, which is adapted to meter the flow of gas through the duct. Positioned anterior to the damper or flow control member 18 is a by-pass opening, indicated at 20, which leads into a by-pass conduit 21, the flow through the by-pass being controlled by a second damper member 22. Preferably the entire by-pass conduit 21 is covered with suitable insulating material 23 in order to prevent any heat losses therein. The setting of the dampers 18 and 22 determines what fraction of the total volume of gas passing through the duct 15 is by-passed into the duct 21. This fraction may vary, depending upon the particular conditions desired, being either one-tenth, one-eighth, or any similar fractional part of the total volume passing through the duct. The duct 21 is provided adjacent the right hand end thereof, as viewed in Figure 2, with a trap indicated at 24, which leads into a suitable drain 25 for a purpose to be hereinafter described.

The duct 21 has a return connection with the main duct 15 through a suitable header member 25, which is preferably provided with a plurality of perforations and is so constructed as to prevent any suction effect at the junction of the return portion of the by-pass and the main duct.

Disposed within the return portion 26 of the duct 21 is a thermometer, indicated generally at 27, which is preferably connected, through suitable control means, such as the electric circuit 28, to a control instrument 29. This control instrument 29, which may be of any desired type of instrument controller, has the conduit 30 leading thereto for supplying the instrument with fluid pressure. A suitable valve 31 controls the supply of this pressure to the controller 29. The outlet from the controller 29, indicated at 33, leads to a suitable diaphragm-operated valve 34, of any desired type, which is adapted to control the flow of steam through the valve 35.

Steam is supplied to the inlet side of the valve 35 through the conduit or pipe 36, this steam preferably being supplied under a constant pressure and temperature. From the outlet side of the valve 35, a second conduit 37 leads to a metering valve 38, or any type of controllable orifice valve, which controls the flow of this steam into a conduit 39 terminating in a perforated end 40 adapted to inject steam into the gas flowing through the conduit 21.

Thus, by setting the controller 29 in accordance with a desired temperature to be maintained in the gas passing through the return portion 26 of the duct, this temperature is sensed by the thermometer 27, which actuates suitable mechanism within the controller 29 to vary the fluid pressure acting upon the diaphragm valve 34, which in turn varies the setting of the steam supply valve 35, and consequently controls the quantity of steam admitted to the injection ports 40. Thus the thermometer 27 is capable of maintaining a desired temperature in the saturated gas passing through the return portion 26 of the duct 21 and into the main body of gas flowing out through the outlet end 17 of the duct 15.

During ordinary operation of such a system, the temperature and humidity of the gas entering the inlet end 16 of the duct 15 does not vary to an extent such that any adjustment must be made for such variations. However, in circumstances in which such variation might be necessary, we have provided an interlocking temperature and humidity sensing mechanism which is connected with the controller 29 in such manner as to further regulate the operation of the diaphragm valve 34 in accordance with changes in either the temperature or humidity of the entering gas stream. As pointed out, the normal range of humidity or temperature variation is of a negligible quantity in such a humidity control system, but it may be desirable, in special instances, to provide such an interlocking connection.

Positioned in the inlet end 16 of the duct 15, we have therefore provided a wet bulb thermometer 42, and a dry bulb thermometer 43, which are connected in parallel, and which are supplied with fluid under pressure through the supply connection 44 controlled by valve 45. The response of these members controls the effective pressure transmitted therethrough, which pressure is additive in the operation of the instrument, and is transmitted through conduit 46 to the controller 29. Thus, an increase in humidity will result in an increase in the amount of pressure passed through the instrument 42, which will result in an increased pressure being transmitted to the controller 29. Similarly, an increase in the dry bulb temperature will produce the same result through the instrumentality of the dry bulb thermostat 43. A decrease in humidity, or a decrease in temperature will result in less pressure being transmitted to the controller 29.

Interlocked with the pressure control from the conduit 46, the control circuit 28 of the thermometer 27 produces the desired variation in the flow of fluid pressure through the outlet conduit 33 of the controller 29, and thus produces the proper operation of the diaphragm valve 34 which results in the proper quantity of steam being admitted into the fractional portion of the gas stream passing through the duct 21.

As previously pointed out, it is apparent that if, for example, one-tenth of the total volume of air flowing through the duct 15 is by-passed into the duct 21, and is saturated with steam by means of the injection ports 40, and its temperature so controlled that its leaving temperature in the return portion 26 of the duct is approximately 96° F., this admixture of the by-passed saturated gas with the main volume of gas flowing through the duct 15 will result in producing a dew point of approximately 30° F. in the gas leaving the outlet end 17 of the main duct. Thus, by regulating the outlet temperature of the by-passed saturated gas, and by controlling its fractional ratio with respect to the main volume of gas, any desired dew point can be maintained in the main body of gas.

We preferably provide a series of elimination baffles indicated at 50, which baffles prevent any entrained particles of water or the like from passing into the main duct 15, these particles of water or the like being caught in the trap 24 and being drained away.

In Figure 3 we have shown a modified form of control system embodying the same principles, but in which the temperature is controlled before saturation is effected. In this embodiment, the by-pass duct is indicated at 21' and is surrounded with insulation as shown at 23'. Disposed in one portion of the duct is a thermally sensitive member 52 and disposed in a posterior portion of the duct is a second thermally sensitive member 53. Interposed between the members 52 and 53 is a heating coil indicated diagrammatically by the numeral 54, which is preferably electrical in character, though this may be optional, and which is controlled by means of the switch 55.

The thermally sensitive members 52 and 53 are connected to a control member 56, which control member is adapted to vary the flow of fluid pressure therethrough into the outlet conduit 57 in accordance with the differential maintained between the thermally sensitive members 52 and 53. Fluid under pressure is supplied to the controller 56 by means of the supply conduit 58 and the control valve 59. The outlet conduit 57 corresponds to the outlet 33 of Figure 2, and is connected to a suitable diaphragm valve which provides for injection of steam at a point posterior to the thermally sensitive member 53. Only sufficient steam is admitted, in this embodiment, to saturate the gas completely, and no condensation occurs. Thus, the temperature being definitely controlled by the heater 54, and the differential temperature being sensed by the members 52 and 53, controlling the injection of steam to the heated fraction of gas, the proper conditions of temperature and humidity in the treated portions of the gas will be maintained, and the admixture of this treated portion with the main volume of gas will result in the proper conditions of humidity, and consequently the proper dew point, being constantly maintained in the main body of gas.

It is obvious that other means of control, and other temperature and humidity sensitive devices may be employed, and it is to be understood that the dew point in the main gas stream is absolutely determined by means of the ratio of the treated portion of gas to the total volume of gas, and by the humidification of the by-passed gas and its diffusion into the main body of gas at a predetermined temperature. For any desired dew point, these conditions can be determined from the graphs shown in Figure 1.

We do not intend to limit our invention to the humidification of natural gas or the like, which has been specifically described in connection with the illustrated embodiment of our invention, since the principles of the invention are equally applicable to the humidifying or dehumidifying of air for an air conditioning system. In such application, the duct might comprise the air duct for conducting the air to the enclosure or enclosures which are to be supplied with conditioned air. By predetermining the ratio of the treated portion of air to the main body of air, and by properly controlling the diffusion temperature of the treated fraction as it enters the main body of gas, any desired dew point may be maintained in the air stream, and also, any desired temperature may be maintained therein, since the temperature of the treated fraction of gas and of the main body of gas or air will produce a resultant temperature which can be accurately determined when the two bodies of air are mixed. Also, instead of a humidifying system, the system is equally applicable for dehumidification purposes, in which case, instead of the ports 40 injecting steam into the fraction of gas which is to be treated, this fraction of gas will be passed over a suitable cooling or refrigerating coil, so that moisture is condensed therefrom. This cooled dried gas or air, upon re-admixture with the main body of gas or air, effects lowering of the humidity of the main body of air or gas, and also lowering of its temperature. Thus, the principles of utilizing the heat content of the gas stream as a means of controlling its humidity, and supplying or removing moisture therefrom in order to regulate this humidity, is applicable either for humidity control systems, or for de-humidifying systems, and may be used either with the control of the humidity of gas, or of atmospheric air.

If the conditions existing in the air before its passage into the inlet end 16 of the duct 15 are substantially constant, the interlocking control means 42 and 43 need not be employed, since the refrigerating medium may be so controlled that for substantially constant conditions present in the entering air, a substantially constant dehumidified condition can be imparted to the air by the treatment of a portion thereof to completely dry and cool the same. However, if the conditions vary in the air being passed into the duct 15, the dry bulb and wet bulb sensing instruments will tend to regulate the refrigerating characteristics in the by-pass, and may also be so connected as to regulate the damper 22 in order to control the quantity of air which is to be dehumidified. The control of the quantity, as well as the control of the temperature and dehumidification, will result in the proper conditions of temperature and humidity being imparted to the air upon the admixture of the two air streams.

It is therefore apparent that our invention is not limited to the specific uses illustrated and described in detail herein, but that the broad principles thereof are equally applicable to other types of humidity control systems, and we do not intend to limit our invention to the illustrated application of our invention herein disclosed. We therefore limit ourselves only as defined by the scope and spirit of the appended claims.

We claim:

1. The method of controlling the humidity of a gas stream flowing in a conduit which comprises completely saturating a bypassed portion of said gas stream at a controlled temperature to quantitatively control the amount of moisture added to said portion of said stream, proportioning the volume of the bypassed stream so saturated at the controlled temperature whereby its admixture with the main stream will produce the desired resultant humidity in the combined streams, and introducing said saturated portion of said stream at said temperature into said main stream.

2. The method of maintaining a predetermined dew point temperature in a gas stream flowing in a conduit which comprises dividing said stream, adding heat to one portion of said stream in the form of steam to produce complete saturation at a predetermined temperature, said heat added to said portion of said stream being equivalent to the heat required in both portions of said stream to maintain said predetermined dew point in said stream, and mixing said divided portions of said stream to carry said heat into the other portion of said stream.

3. The method of controlling the humidity of a gas stream which comprises dividing said stream into fractional portions, heating one of said fractional portions, automatically saturating said heated portion in accordance with the temperature differential between the unheated and heated portions thereof to introduce a predetermined quantity of moisture into said heated portion of said stream, and recombining said fractional portions to produce partial saturation in said gas stream.

4. In apparatus for controlling the humidity of a gas stream, the combination of a main duct and a by-pass duct, means for controlling the volume of gas passing through said ducts, humidifying means disposed in said by-pass duct, thermally sensitive means posterior to said humidifying means and responsive to the temperature of the gas in said by-pass duct for controlling said humidifying means to saturate said gas at a predetermined temperature, and means for returning said saturated gas from said by-pass duct to said main duct to carry a predetermined quantity of moisture into the gas in said main duct.

5. The method of maintaining a substantially constant dew point in a gas stream which comprises injecting steam into a second gas stream to introduce into said second stream a predetermined quantity of moisture at a predetermined temperature, controlling the injection of steam in accordance with the temperature of the saturated portion of said second stream, and introducing said saturated second stream into said first stream to carry said moisture into said first stream for producing a predetermined moisture content in said first stream.

6. The method of maintaining a substantially constant predetermined dew point in a gas stream flowing through a conduit which comprises by-passing a fixed fractional portion of said stream, saturating said by-passed portion by the injection of steam thereinto, controlling the quantity of steam injected in accordance with the temperature of said by-passed portion after saturation and prior to its return to said main gas stream to control the quantity of moisture added to said by-passed portion in accordance with the quantity of moisture necessary to produce said dew point in the main gas stream, and introducing said saturated by-passed portion into said main stream to carry the moisture into said main stream.

7. The method of maintaining a substantially constant predetermined dew point in a gas stream flowing through a conduit which comprises by-passing a fixed fractional portion of said stream, injecting steam into said by-passed portion to add a predetermined quantity of moisture thereto sufficient to produce the desired dew point in the main gas stream, controlling the injection of said steam in accordance with the temperature of said saturated by-passed portion prior to its return to said main gas stream, and introducing said by-passed portion into said conduit to carry said moisture into said main gas stream.

8. The method of adding a predetermined quantity of moisture to a gas stream flowing through a conduit which comprises injecting steam into a second volume of gas to produce complete saturation of said second volume of gas at a predetermined temperature whereby said predetermined quantity of moisture is carried in said second volume of gas, controlling said temperature of said second volume of saturated gas in accordance with the humidity of said first gas stream in said conduit prior to addition of said predetermined quantity of moisture thereto, and introducing said second volume of gas into said conduit whereby said second volume of gas carries said moisture into said gas stream.

9. In combination, a main gas duct, a secondary gas duct, steam injection means in said secondary duct, thermally sensitive means in said secondary duct posterior to said injection means for controlling said injection means to produce saturation of gas in said secondary duct at a predetermined temperature whereby the absolute moisture content of said gas is sufficient to produce a predetermined dew point in the gas flowing through said main duct, and means for subsequently introducing the saturated gas from said secondary duct into said main duct to carry said moisture into the gas in said main duct.

10. In combination, a main duct carrying gas under relatively constant temperature and humidity conditions, means for sensing substantial variations in said conditions, a secondary duct, means for saturating the gas in said secondary duct, means in said secondary duct responsive to the temperature of said saturated gas for controlling said saturated means to produce a predetermined moisture content in the gas in said secondary duct sufficient to produce a predetermined dew point in the gas in the main duct, and means for introducing said saturated gas from said secondary duct into said main duct posterior to said sensing means, said sensing means correcting the control of said temperature responsive means in accordance with substantial variations in the condition of the gas in the main duct.

11. The method of maintaining a predetermined quantity of moisture in a gas stream flowing through a conduit under substantially constant temperature and humidity conditions, which comprises introducing said predetermined quantity of moisture into a second gas stream, controlling the temperature of the second gas stream to maintain only said predetermined quantity of moisture therein, introducing said second gas stream into said first gas stream to carry said quantity of moisture into said first gas stream, and varying the predetermined quantity of moisture introduced into said second gas stream only in accordance with substantial variations of humidity and temperature in said first gas stream.

12. A method of producing a mixture of gas and water vapor having known characteristics of temperature and humidity which comprises injecting steam under pressure into a volume of gas to produce a completely saturated body of gas at a temperature substantially higher than the normal temperature desired in said mixture and having a known quantity of water vapor therein, and diluting said volume of heated and saturated gas with a second predetermined volume of gas to produce a mixture of gas and water vapor having said known characteristics.

LOREN W. TUTTLE.
GEORGE W. WARRICK.